(12) United States Patent
Arai et al.

(10) Patent No.: US 6,963,471 B2
(45) Date of Patent: Nov. 8, 2005

(54) WIRING MEMBER OF A DISC DRIVE SUSPENSION HAVING AN INSULATING LAYER WITH THICK-WALLED AND THIN-WALLED PORTIONS

(75) Inventors: Hajime Arai, Aiko-gun (JP); Ikuo Someya, Sagamihara (JP)

(73) Assignee: NHK Spring Co., Ltd., Yokohama (JP)

( * ) Notice: Subject to any disclaimer, the term of this patent is extended or adjusted under 35 U.S.C. 154(b) by 252 days.

(21) Appl. No.: 10/408,711

(22) Filed: Apr. 7, 2003

(65) Prior Publication Data

US 2003/0193753 A1 Oct. 16, 2003

(30) Foreign Application Priority Data

Apr. 10, 2002 (JP) .......................... 2002-107986

(51) Int. Cl.$^7$ .............................. G11B 5/48; G11B 5/58
(52) U.S. Cl. ..................... 360/246; 360/245.8
(58) Field of Search .................... 360/245.8, 245.9, 360/246

(56) References Cited

U.S. PATENT DOCUMENTS

| | | | |
|---|---|---|---|
| 6,046,887 A | 4/2000 | Uozumi et al. | 360/245.9 |
| 6,295,183 B1 | 9/2001 | Nuno et al. | 360/246 |
| 6,385,014 B1 * | 5/2002 | Nuno et al. | 360/246 |
| 6,404,594 B1 * | 6/2002 | Maruyama et al. | 360/245.8 |
| 6,424,500 B1 * | 7/2002 | Coon et al. | 360/245.9 |
| 6,614,624 B2 * | 9/2003 | Shiraishi et al. | 360/245.9 |
| 6,714,385 B1 * | 3/2004 | Even et al. | 360/246 |
| 6,807,029 B2 * | 10/2004 | Someya | 360/245.9 |

* cited by examiner

*Primary Examiner*—Jefferson Evans
(74) *Attorney, Agent, or Firm*—Frishauf, Holtz, Goodman & Chick, P.C.

(57) ABSTRACT

A wired flexure comprises a metallic substrate, a polyimide layer formed on the metallic substrate, and read conductors and write conductors formed on the polyimide layer. The polyimide layer has a thick-walled portion and a thin-walled portion that are different in thickness. The read and write conductors extend covering the thick- and thin-walled portions. In order to obtain a desired impedance, the width of the conductors in the thin-walled portion is smaller than that of the conductors in the thick-walled portion.

12 Claims, 9 Drawing Sheets

WIRING MEMBER OF A DISC DRIVE SUSPENSION HAVING AN INSULATING LAYER WITH THICK-WALLED AND THIN-WALLED PORTIONS

CROSS-REFERENCE TO RELATED APPLICATIONS

This application is based upon and claims the benefit of priority from the prior Japanese Patent Application No. 2002-107986, filed Apr. 10, 2002, the entire contents of which are incorporated herein by reference.

BACKGROUND OF THE INVENTION

1. Field of the Invention

The present invention relates to a wiring member of a suspension for disc drive incorporated in an information processing apparatus such as a personal computer.

2. Description of the Related Art

A hard disc drive (HDD) for recording in and reproducing information from a rotating magnetic or magneto-optical disc has a carriage that is turnable around a shaft. The carriage is turned around the shaft by means of a positioning motor. The carriage comprises an arm (actuator arm), a suspension on the distal end portion of the arm, a head section including a slider mounted on the suspension, etc.

When the disc rotates, the slider on the distal end portion of the suspension slightly lifts above the surface of the disc, and an air bearing is formed between the disc and the slider. The suspension comprises a base section including a base plate, a load beam section extending in the longitudinal direction of the suspension, a flexure that is fixed to the load beam section by laser welding or the like, etc.

There are flexures of various forms that are based on required specifications. Wired flexures have been developed by way of example. A wired flexure includes a thin metallic substrate of stainless steel, a polyimide layer as an electric insulating layer formed on the metallic substrate, read conductors and write conductors formed on the polyimide layer, etc.

One end of each of the read and write conductors is connected electrically to a terminal of a slider of a head section on the distal end portion of the flexure. The other end of each conductor is connected to a terminal that is located near the actuator arm, for example.

Conventionally, in a wiring member having portions (so-called aerial wiring portions) that are free from the metallic substrate, the polyimide layer must be uniformly thickened in order to secure the mechanical strength of the aerial wiring portions.

If the polyimide layer is thick, impedance matching with an electric component makes the space between the read and write narrower on account of dimensional restrictions on the wiring member, so that the problem of cross talk is aroused. The cross talk is a phenomenon such that signals transmitted to the write conductors interfere with the read conductors and vice versa.

BRIEF SUMMARY OF THE INVENTION

Accordingly, the object of the present invention is to provide a wiring member of a suspension for disc drive, capable of securing mechanical strength and enjoying improved cross talk characteristics.

According to the present invention, the above problem is solved by providing a thick insulating layer and a thin insulating layer on a part of a wiring member. The wiring member of the present invention comprises a metallic substrate, an electrical insulating layer formed on the metallic substrate and having a thick-walled portion and a thin-walled portion different in thickness, and a conductor formed on the insulating layer, at least a part of the conductor extending covering the thick- and thin-walled portions of the insulating layer.

According to this configuration, desired mechanical and electrical characteristics can be obtained by partially varying the thickness of the electrical insulating layer. For example, the impedance of the wiring member can be lowered by thinning the insulating layer. On the other hand, the impedance can be enhanced by thickening the insulating layer. Thus, the availability of electric components to be connected to the wiring member can be improved. Further, the mechanical strength of the thin-walled portion can be increased.

If fixed impedance is to be obtained in the thin-and thick-walled portions, according to the present invention, the width of the conductor in the thin-walled portion may be made smaller than that of the conductor in the thick-walled portion. According to this configuration, the substantially fixed impedance can be secured by thinning the insulating layer and reducing the width of the conductors, so that the space between the conductors can be widened.

Preferably, the wiring member of the invention further comprises a close wiring portion in which read conductors and write conductors closely adjoin one another in parallel relation and a rough wiring portion in which the read conductors and the write conductors are relatively distant from one another, the thin-walled portion being formed in the close wiring portion, and a space effective for the reduction of cross talk is secured between the read conductors and the write conductors in a manner such that the width of at least one of the read and write conductors in the thin-walled portion is smaller than that of each conductor in the thick-walled portion. According to this configuration, the cross talk characteristics can be improved in the close wiring portion in which the read conductors and the write conductors are located close to one another.

Preferably, moreover, a part of each of the conductors in the longitudinal direction is formed having an aerial wiring portion such that the insulating layer and the metallic substrate never overlap each other, the aerial wiring portion having the thick-walled portion. According to this configuration, the mechanical strength of the aerial wiring portion can be enhanced.

If a hinge section is located between the base section and the load beam section, the thin-walled portion should be provided in a part that extends along the hinge section so that the part extending along the hinge section is flexible. Further, the capacitor components of a connecting pad can be reduced by providing the connecting pad with the thick-walled portion. According to this configuration, the flexibility of the wiring member in the hinge section can be secured by providing the thin-walled portion in the part that extends along the hinge section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 6. A suspension 10A for disc drive shown in FIG. 1 comprises a base section 12 including a base plate 11, a load beam section 14 extending from the base section 12 toward a head section 13 of the suspension 10A, a wired flexure 15 attached to the load beam section 14, etc. The wired flexure 15 is an example of a wiring member according to the invention. The base section 12 is fixed to an actuator arm (not shown) of a disc drive.

Figure 2:
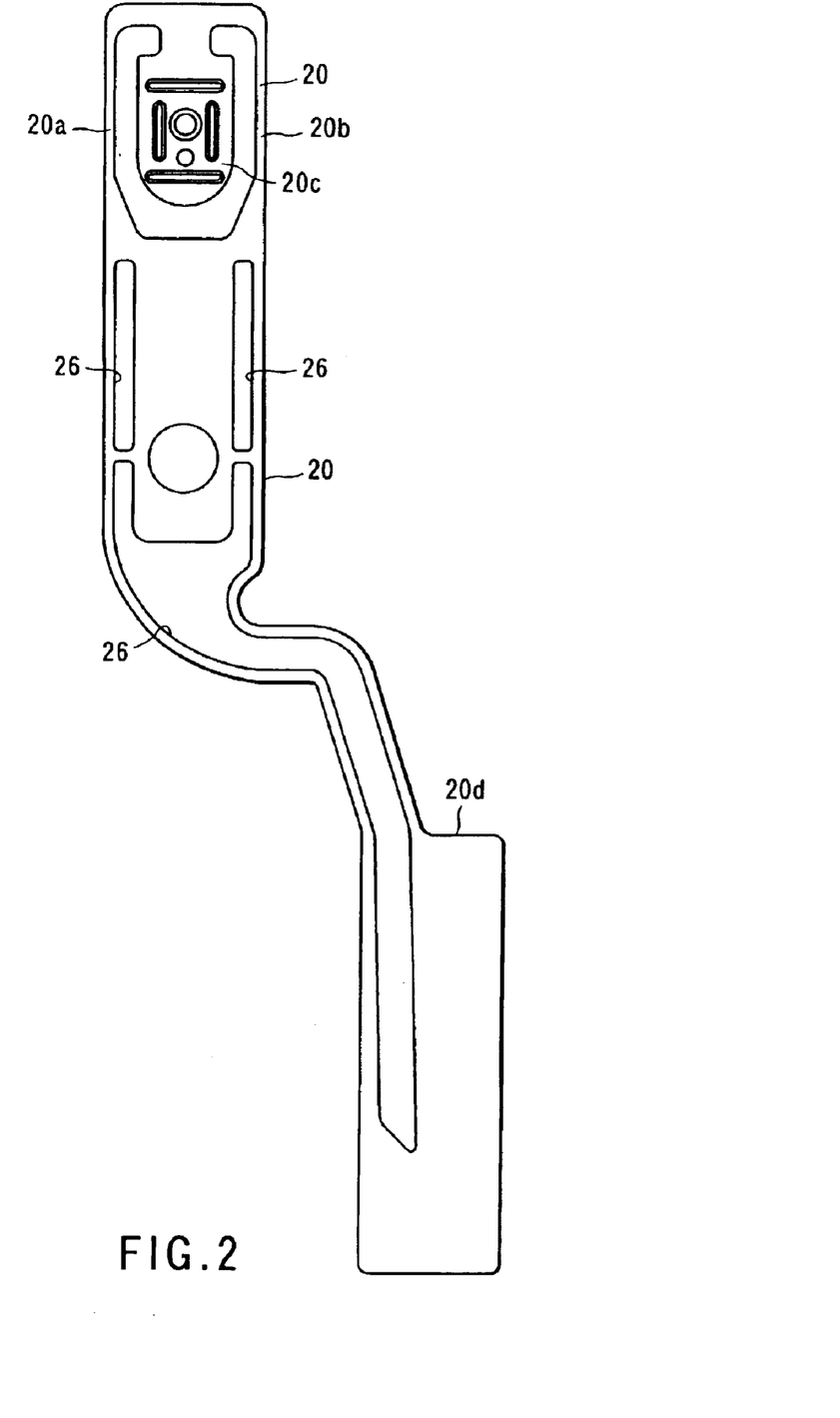
FIG. 2 is a plan view of a metallic substrate of the wiring member shown in FIG. 1.

The wired flexure 15 is provided with a metallic substrate 20 shown in FIG. 2. The substrate 20 is made of a springy conductive material (e.g., rolled stainless steel), and its thickness is about 20 $\mu$m, for example. The thickness of the load beam section 14 is about 100 $\mu$m, for example.

Figure 3:
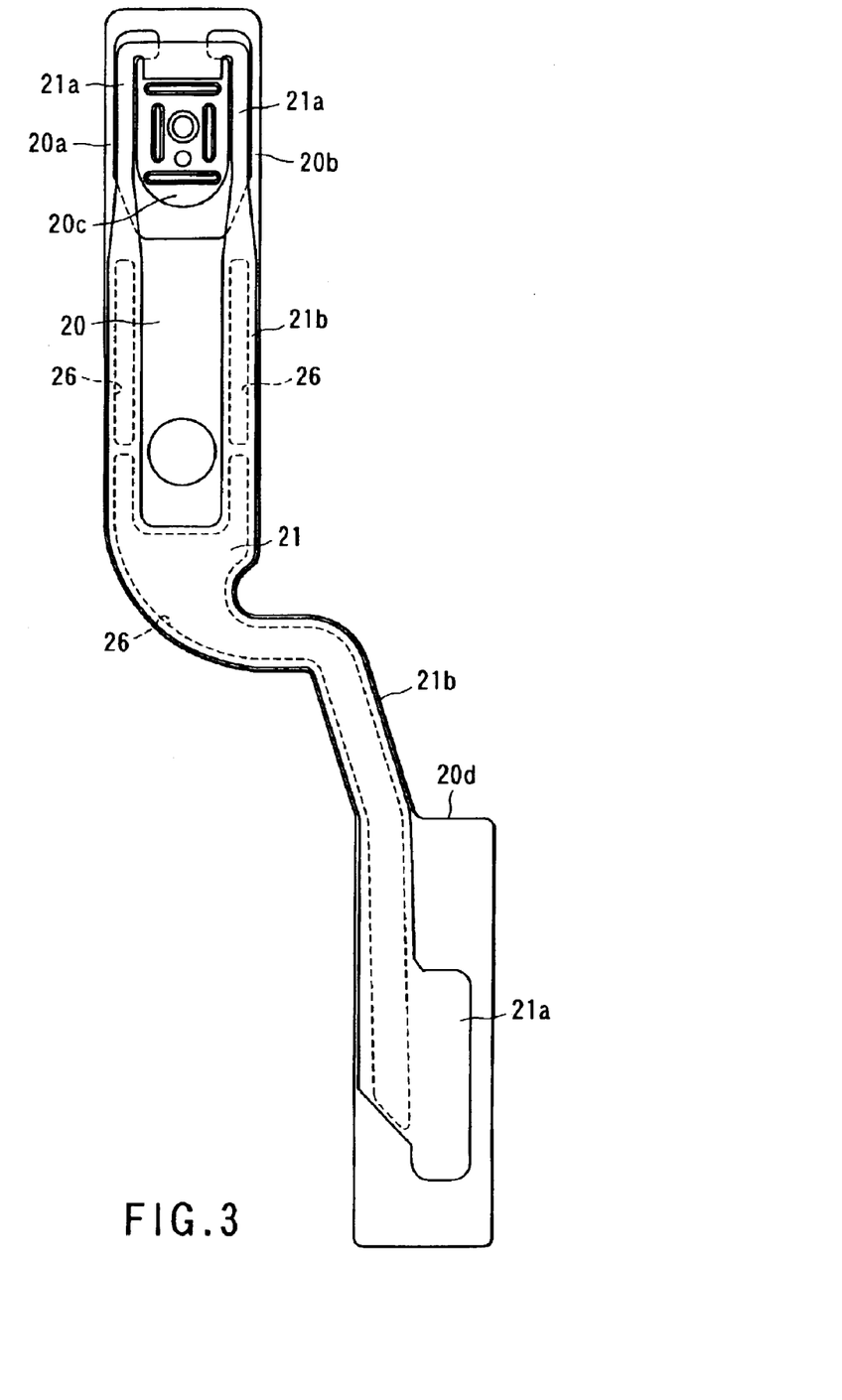
FIG. 3 is a plan view of the metallic substrate and a polyimide layer of the wiring member shown in FIG. 1.

As shown in FIG. 3, a polyimide layer 21 of synthetic resin such as polyimide is formed on the metallic substrate 20. The polyimide layer 21 is an example of an electrical insulating layer according to the invention. The polyimide layer 21 has a thick-walled portion 21a and a thin-walled portion 21b (mentioned later) that are different in thickness.

A pair of read conductors 22 are arranged on the polyimide layer 21, and a pair of write conductors 23 are arranged along the read conductors 22, individually. These conductors 22 and 23 are made of a conductive material such as copper, and are formed into a desired wiring pattern by etching a thin copper sheet laminated to the polyimide layer 21 or by depositing a copper layer.

Figure 4:
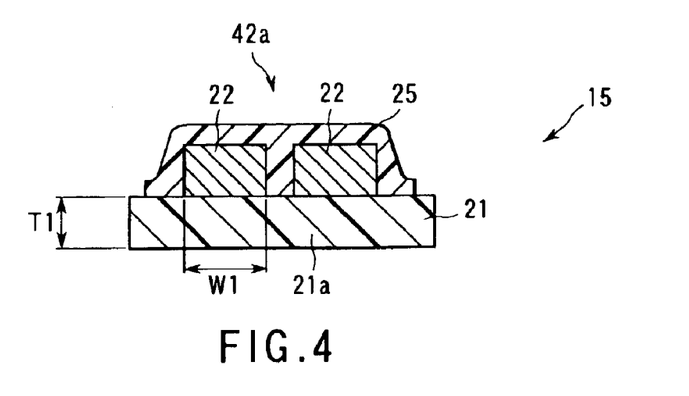
FIG. 4 is a sectional view of an aerial wiring portion of read conductors of the wiring member shown in FIG. 1.
Figure 5:
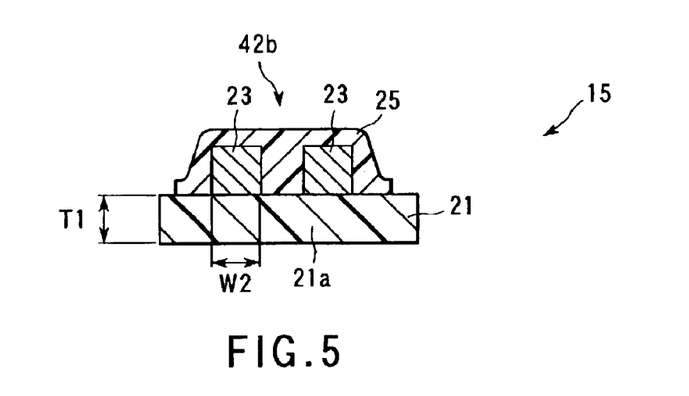
FIG. 5 is a sectional view of an aerial wiring portion of write conductors of the wiring member shown in FIG. 1.
Figure 6:
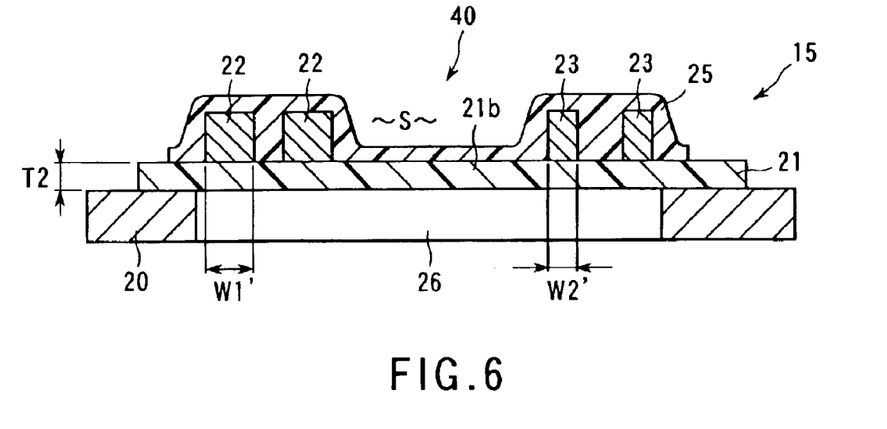
FIG. 6 is a sectional view of the wiring member taken along line F6—F6 of FIG. 1.

As shown in FIGS. 4 to 6, a cover layer 25 of resin such as polyimide covers the respective surfaces of the conductors 22 and 23. An opening 26 for the adjustment of the impedance of the conductors 22 and 23 or bending stiffness and the like is formed in a suitable position in the metallic substrate 20.

The distal end portion of the metallic substrate 20 is formed having a pair of outrigger portions 20a and 20b that can bend in the thickness direction and a tongue portion 20c that is supported by the outrigger portions 20a and 20b. The tongue portion 20c is fitted with a slider 27 (indicated by two-dot chain line in FIG. 1) that constitutes the head section 13. Further, the substrate 20 has an extending portion 20d that extends toward the base section 12.

Figure 1:
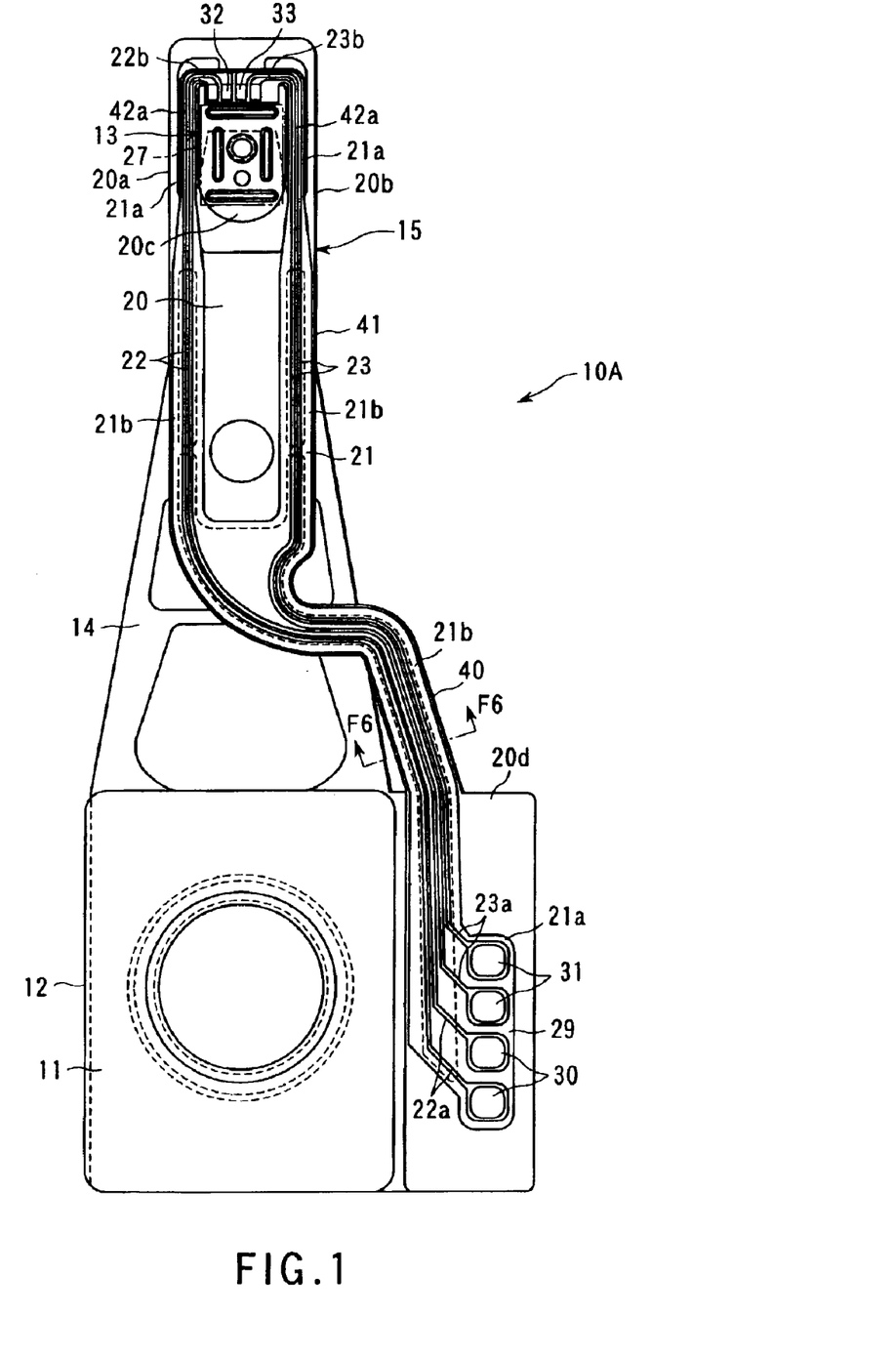
FIG. 1 is a plan view of a suspension for disc drive having a wiring member according to a first embodiment of the invention.

The slider 27 is provided with a magneto-electric element such as an MR element, which can reciprocally convert electric and magnetic signals. Record data in a disc that are read by means of the magneto-electric element are converted into electric signals and transmitted to a data processor (not shown) through the read conductors 22. In recording data in the disc, electric signals for the data to be recorded are transmitted from the data processor to the magneto-electric element through the write conductors 23.

The metallic substrate 20 of the wired flexure 15 is attached to the load beam section 14 in a manner such that they are superposed in the thickness direction of the load beam section 14. For example, the metallic substrate 20 is fixed to the load beam section 14 by laser welding or the like on other spots than the outrigger portions 20a and 20b and the tongue portion 20c.

One end 22a of each read conductor 22 and one end 23a of each write conductor 23 are connected to their corresponding ones of terminals 30 and 31 that are formed on a connecting pad 29 at the proximal portion of the wired flexure 15. The other end 22b of each read conductor 22 and the other end 23b of each write conductor 23 are connected to terminals 32 and 33 on the tongue portion 20c, respectively. These terminals 32 and 33 are connected electrically to the terminal area of the magneto-electric element of the slider 27 by wire bonding or the like.

The wired flexure 15 has a close wiring portion 40 in which the read conductors 22 and the write conductors 23 closely adjoin one another in parallel relation. Further, the wired flexure 15 has a rough wiring portion 41 in which the read and write conductors 22 and 23 are relatively distant from one another. The space between the conductors 22 and 23 of the rough wiring portion 41 is wider than the space between the conductors 22 and 23 of the close wiring portion 40.

Aerial wiring portions 42a and 42b are formed along certain portions of the read and write conductors 22 and 23 in the longitudinal direction, e.g., the outrigger portions 20a and 20b. In these wiring portions 42a and 42b, the polyimide layer 21 and the metallic substrate 20 never overlap each other.

The polyimide layer 21 has portions having at least two thicknesses with respect to the longitudinal direction of the conductors 22 and 23. More specifically, the polyimide layer 21 has the thick-walled portion 21a and the thin-walled portion 21b that are different in thickness. The conductors 22 and 23 extend covering the thick- and thin-walled portions 21a and 21b.

The thickness (T1) of the thick-walled portion 21a is 10 µm, for example. The thickness (T2) of the thin-walled portion 21b is 5 µm. A photo-setting resin may be used for the polyimide layer 21, for example, whereby the thickness of the layer 21 can be varied. In this case, the thickness of any desired part of the polyimide layer 21 can be regulated by adjusting the exposure time.

The wired flexure 15 is provided with the thin-walled portion 21b in a region where the polyimide layer 21 and the metallic substrate 20 overlap each other.

As shown in FIGS. 4 and 5, moreover, the aerial wiring portions 42a and 42b are provided with the thick-walled portion 21a.

As shown in FIG. 6, the close wiring portion 40 is provided with the thin-walled portion 21b in order to obtain a given impedance. In this close wiring portion 40, the respective widths W1' and W2' of the conductors 22 and 23 are made smaller than the respective widths W1 and W2 of the conductors 22 and 23 of the thick-walled portion 21a.

By doing this, a space S that is effective for the reduction of cross talk is secured between the read conductors 22 and the write conductors 23. Further, the capacitor components of the connecting pad 29 can be reduced by providing the connecting pad 29 with the thick-walled portion 21a.

Figure 10:
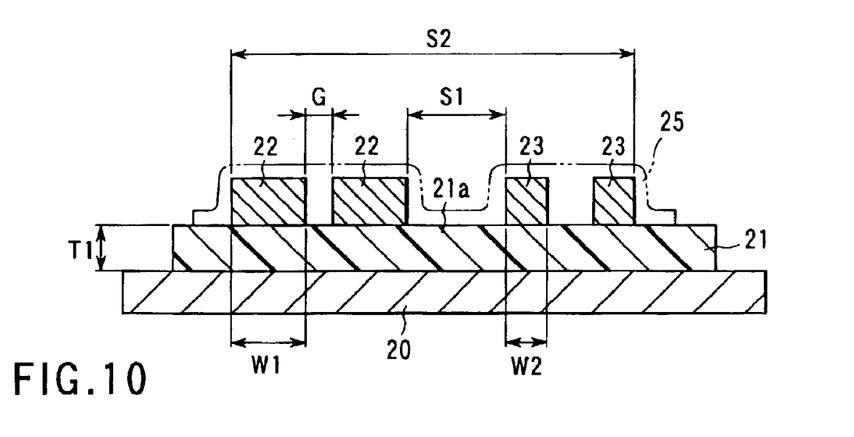
FIG. 10 is a sectional view typically showing a part of a wiring member having a thick-walled portion.

In a wired flexure typically shown in FIG. 10, cross talk caused in the conductors 22 and 23 depends on a space S1 between the conductors 22 and 23.

Figure 13:
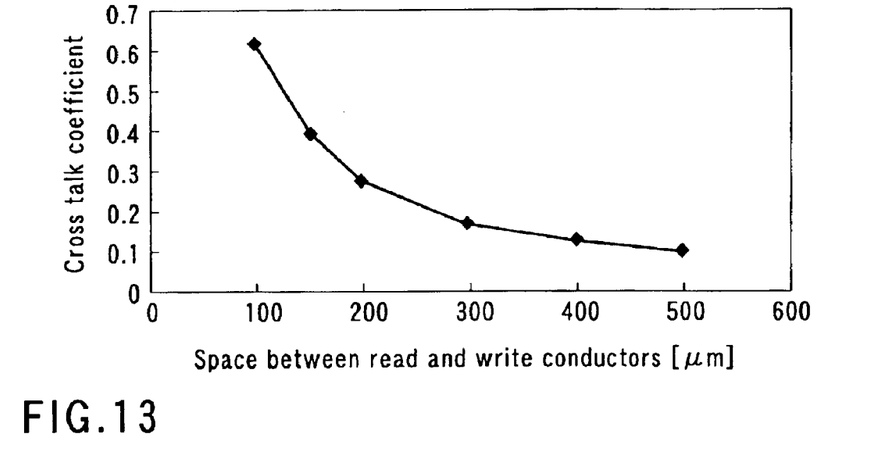
FIG. 13 is a diagram showing the relation between the cross talk coefficient and the space between the conductors.

FIG. 13 shows the relation between the cross talk coefficient and the space S1 between the conductors 22 and 23 established when the space S1 is changed from 100 µm to 500 µm. The thickness T1 of the polyimide layer 21 is 10 µm. The thickness of each of the conductors 22 and 23 is 17 µm. The wider the space S1 between the conductors 22 and 23, the lower the cross talk coefficient is, as shown in FIG. 13. Cross talk can be reduced by increasing the space S1 between the conductors 22 and 23.

Owing to spatial restrictions, however, a wiring-area width S2 of the wired flexure cannot be increased unlimitedly. It is to be desired, therefore, that the space S1 between the conductors 22 and 23 should be increased within the range of the limited wiring-area width S2. Cross talk can be reduced by only lessening at least one of the respective widths W1 and W2 of the conductors 22 and 23.

If the impedance is fixed, the narrower the space between the metallic substrate 20 and the conductors 22 and 23, that is, the thinner the polyimide layer 21, the smaller the widths W1 and W2 of the conductors 22 and 23 are.

The widths of the conductors can be lessened by reducing the thickness of the polyimide layer from 10 µm to 5 µm, as shown in TABLE 1, for example. In TABLE 1, a space G (shown in FIG. 10) between the conductors is 20 µm.

TABLE 1

| Impedance | Conductor width with polyimide layer thickness of 10 µm | Conductor width with polyimide layer thickness of 5 µm |
| --- | --- | --- |
| 60 Ω | 45 µm | 25 µm |
| 50 Ω | 70 µm | 40 µm |
| 40 Ω | 120 µm | 70 µm |
| 30 Ω | 200 µm | 120 µm |

Figure 11:
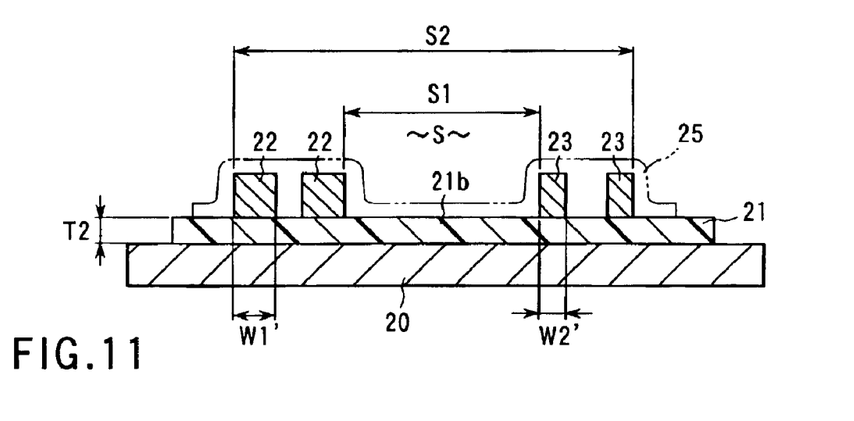
FIG. 11 is a sectional view typically showing a part of a wiring member having a thin-walled portion.

As shown in FIG. 11, the respective widths W1' and W2' of the conductors 22 and 23 on the thin-walled portion 21b can be reduced for the reasons described above. Without changing the wiring-area width S2, therefore, the space S1 between the conductors 22 and 23 can be made wider than in the case where the thick-walled portion 21a shown in FIG. 10 is provided with the conductors 22 and 23.

Figure 12:
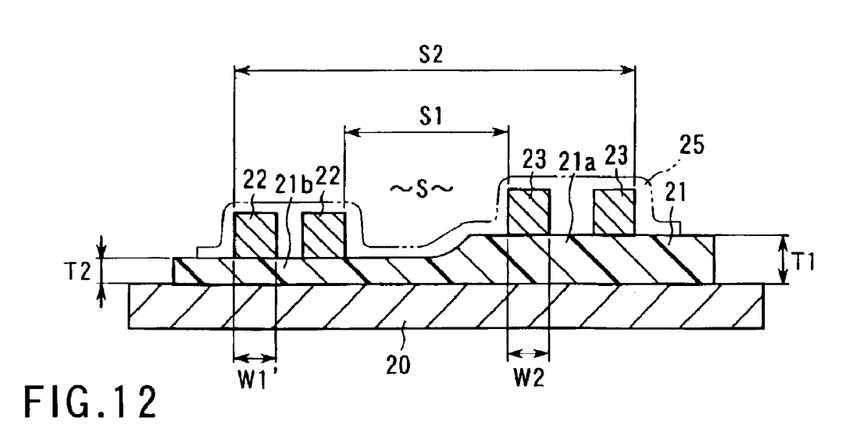
FIG. 12 is a sectional view typically showing a part of a wiring member having a thick-walled portion and a thin-walled portion.

As shown in FIG. 12, moreover, the width W1' of each read conductor 22 can be made smaller than the width W1 of each read conductor 22 shown in FIG. 10 by forming the thin-walled portion 21b of the polyimide layer 21 in the region for the read conductors 22. Alternatively, the width of each write conductor 23 can be made small by forming the thin-walled portion in the region for the write conductors 23.

Figure 14:
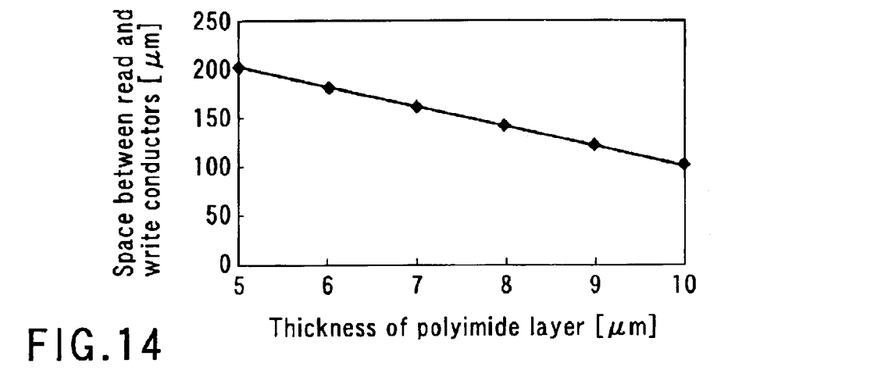
FIG. 14 is a diagram showing the relation between the thickness of the polyimide layer and the space between the conductors.

FIG. 14 shows the relation between the thickness of the polyimide layer 21 and the space S1 between the conductors 22 and 23 with the impedance fixed. The thinner the polyimide layer 21, the wider the space S1 between the conductors 22 and 23 can be, as shown in FIG. 14.

Figure 15:
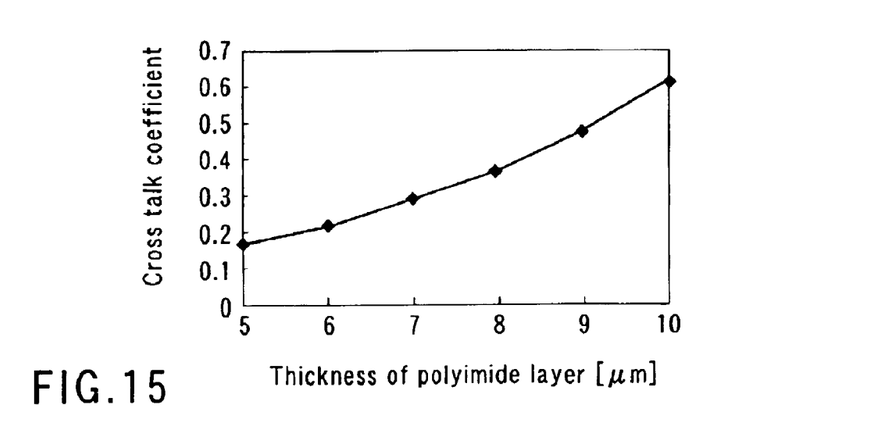
FIG. 15 is a diagram showing the relation between the thickness of the polyimide layer and the cross talk coefficient.

FIG. 15 shows the relation between the thickness of the polyimide layer 21 and the cross talk coefficient. As mentioned before, the width of the conductors 22 and 23 can be reduced by thinning the polyimide layer 21. The thinner the polyimide layer 21, therefore, the lower the cross talk coefficient is, as shown in FIG. 15. Thus, if the polyimide layer 21 is thinned, cross talk can be reduced without failing to secure the given impedance within the given range of the limited wiring-area width S2.

Figure 7:
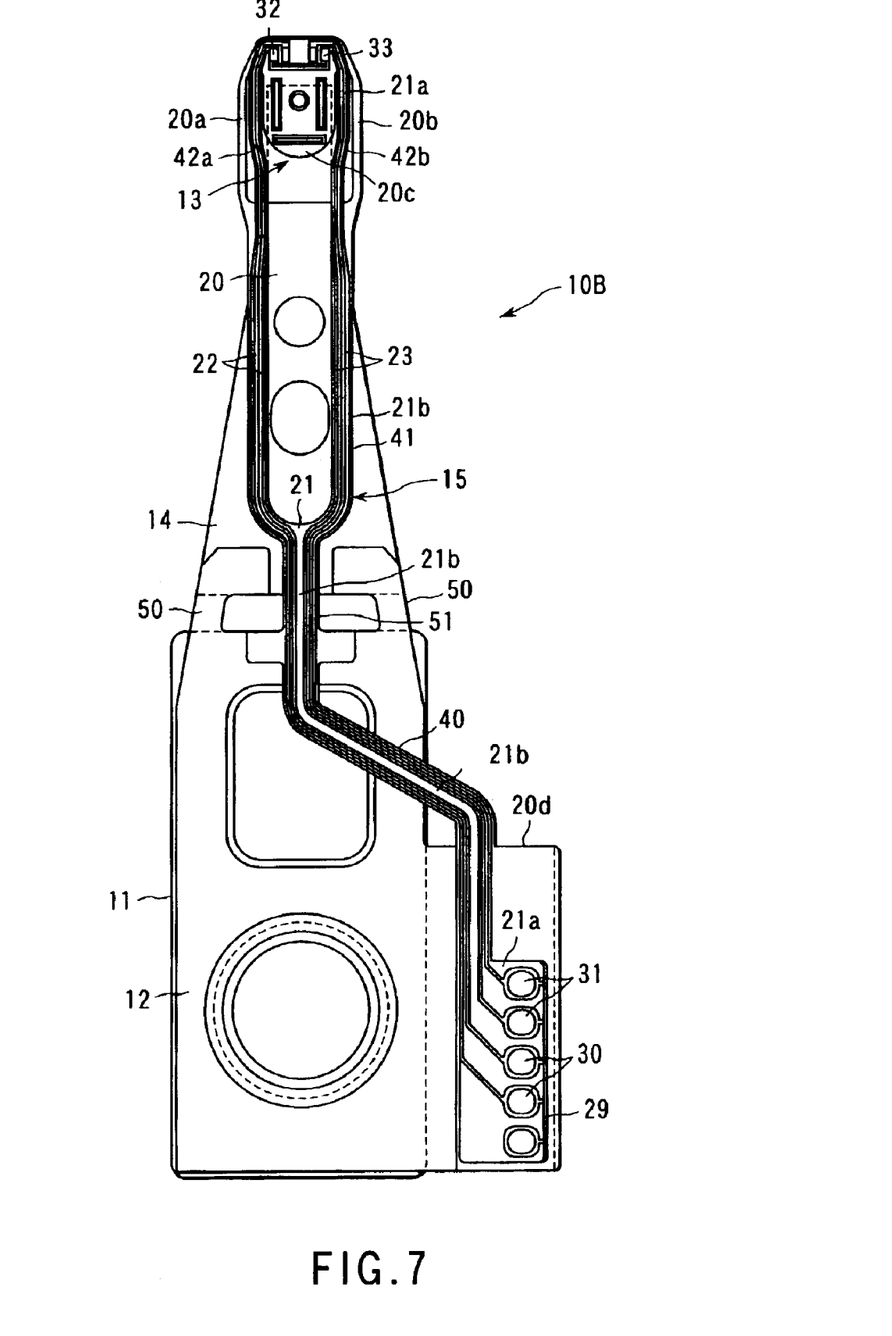
FIG. 7 is a plan view of a suspension for disc drive according to a second embodiment of the invention.

FIG. 7 shows a suspension 10B for disc drive according to a second embodiment of the invention. This suspension 10B is provided with a hinge section 50 that is located between a base section 12 and a load beam section 14 and can bend in the thickness direction of the load beam section 14.

A wired flexure 15 that is attached to the suspension 10B has the thin-walled portion 21b of the polyimide layer 21, which is formed in a part 51 corresponding to the hinge section 50. The thin-walled portion 21b in the part 51 that extends along the hinge section 50 lessens the stiffness of the part 51, thereby securing the flexibility of the hinge section 50. The suspension 10B of the second embodiment shares other configurations and functions with the suspension 10A of the first embodiment. Therefore, like numerals are used to designate common parts of the two suspensions, and a description of those parts is omitted.

Figure 8:
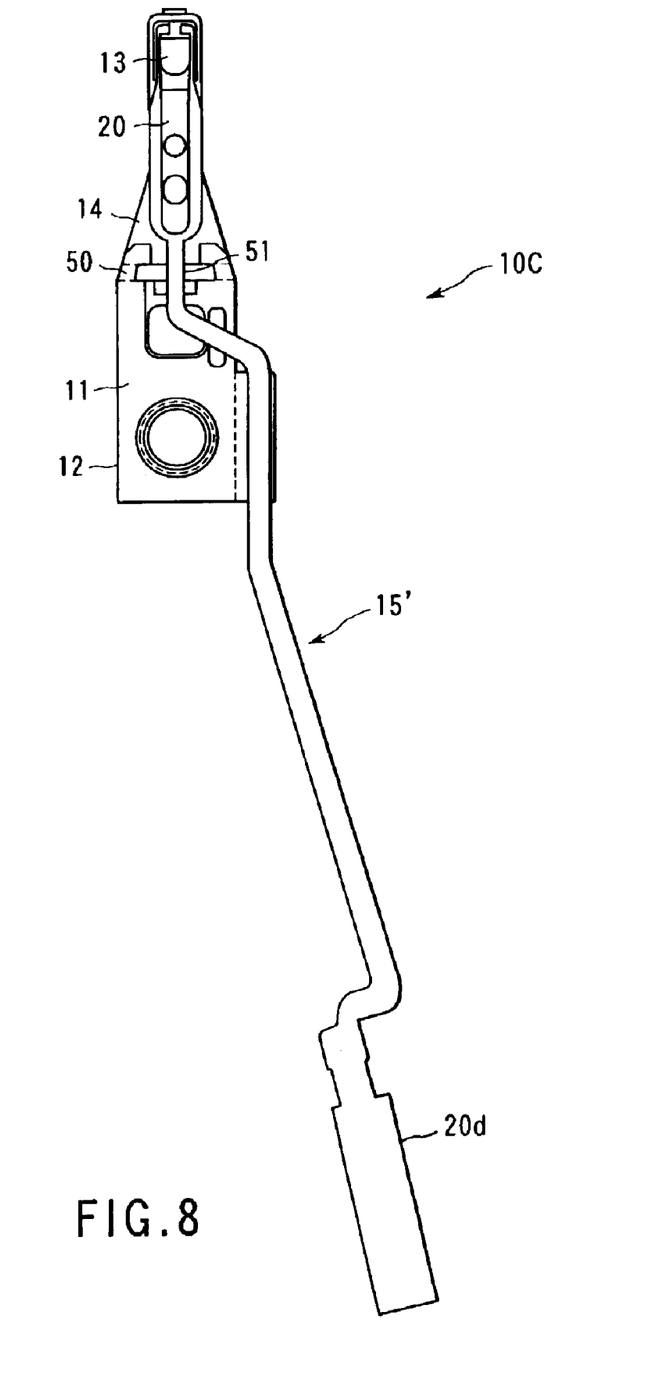
FIG. 8 is a plan view of a suspension for disc drive according to a third embodiment of the invention.
Figure 9:
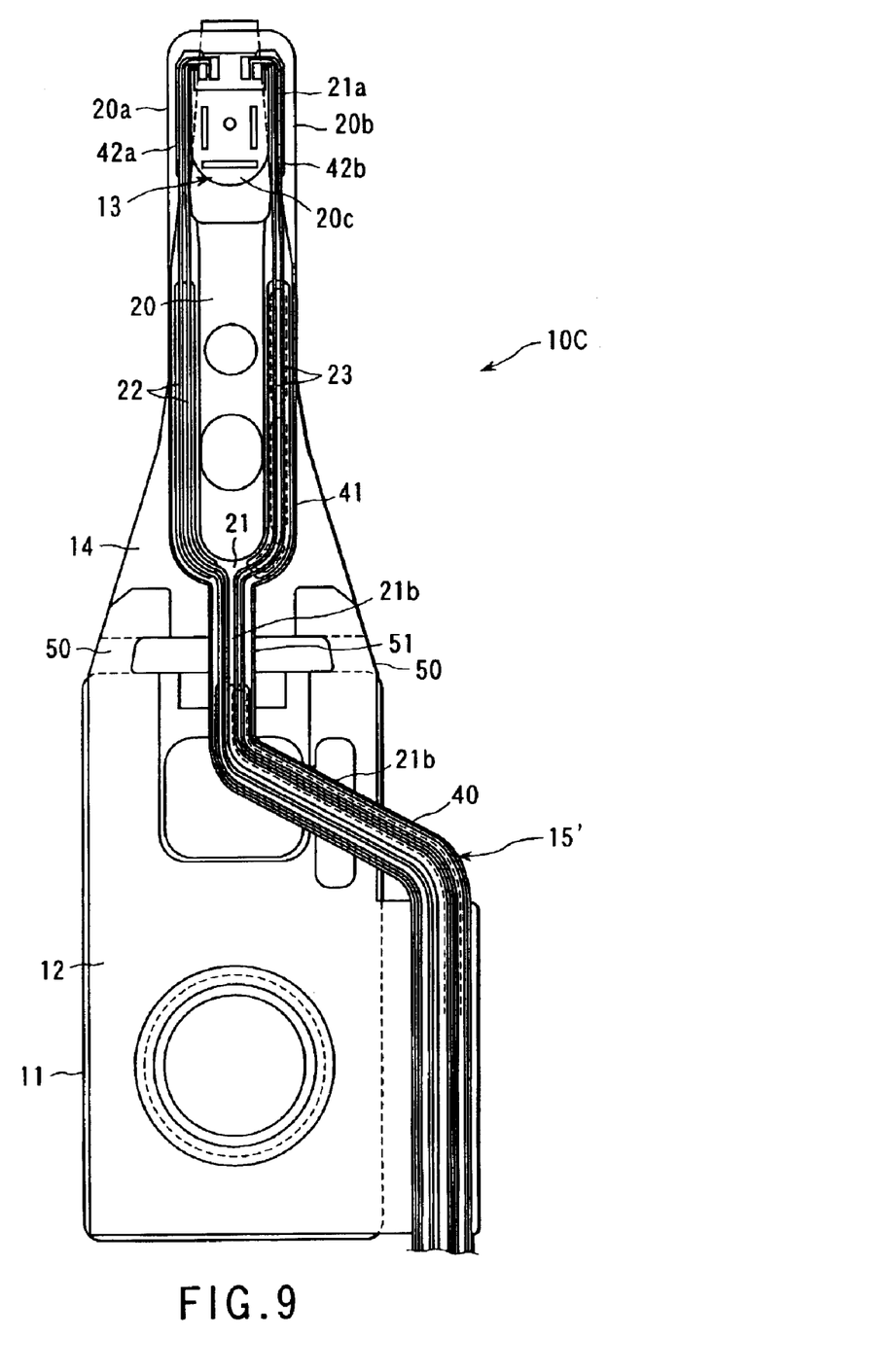
FIG. 9 is an enlarged plan view showing a part of the suspension for disc drive shown in FIG. 8.

FIGS. 8 and 9 show a suspension 10C for disc drive according to a third embodiment of the invention. This suspension 10C is provided with a wired flexure 15' of the so-called long type. As shown in FIG. 9, the distal end portion of the suspension 10C of the third embodiment is constructed in the same manner as that of the suspension 10B (FIG. 7) of the second embodiment. Therefore, like numerals are used to designate common parts of these two suspensions, and a description of those parts is omitted.

It is to be understood, in carrying out the present invention represented by the embodiments described herein, that the components of the invention, including the respective configurations of the metallic substrate, electric insulating layer, read conductors, write conductors, etc., may be suitably changed or modified without departing from the scope or spirit of the invention. The invention is also applicable to any other wiring members for suspensions than wired flexures. Alternatively, any other synthetic resin may be used as the electrical insulating layer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wiring member for a suspension for a disc drive, wherein the suspension comprises a base section, a load beam section, and a flexure extending along the load beam section, said wiring member comprising:
   a metallic substrate;
   an electrical insulating layer which is formed on the metallic substrate, and which includes a thick-walled portion and a thin-walled portion which are different in thickness; and
   read conductors and write conductors formed on the insulating layer such that a part of the each of the conductors extends over the thick-walled portion of the insulating film and a part of each of the conductors extends over the thin-walled portion of the insulating layer;
   a close wiring portion in which the read conductors and the write conductors are provided close together and in parallel; and
   a rough wiring portion in which the read conductors are farther apart from the write conductors than in the close wiring portion;
   wherein the thin-walled portion of the insulating layer is provided in the close wiring portion; and
   wherein a space effective for reduction of cross talk is provided between the read conductors and the write conductors, such that a width the part of at least one of the conductors over the thin-walled portion is smaller than a width of the part of each of the conductors over the thick-walled portion.

2. The wiring member according to claim 1, wherein a width of the part of each of the conductors over the thin-walled portion is smaller than a width of the part of the corresponding conductor over the thick-walled portion.

3. The wiring member according to claim 2, wherein a part of each of the conductors is provided in an aerial wiring portion in a longitudinal direction thereof, and the insulating layer in the aerial wiring portion does not overlap the metallic substrate; and
   wherein the thick-walled portion of the insulating layer is provided at least in the aerial wiring portion, and the thin-walled portion is provided in a region where the insulating layer and the metallic substrate overlap.

4. The wiring member according to claim 3, further comprising a hinge section which is located between the base section and the load beam section and which is bendable in a thickness direction of the load beam section.

5. The wiring member according to claim 2, further comprising a hinge section which is located between the base section and the load beam section and which is bendable in a thickness direction of the load beam section.

6. The wiring member according to claim 1, wherein a part of each of the conductors is provided in an aerial wiring portion in a longitudinal direction thereof, and the insulating layer in the aerial wiring portion does not overlap the metallic substrate; and
   wherein the thick-walled portion of the insulating layer is provided at least in the aerial wiring portion, and the thin-walled portion is provided in a region where the insulating layer and the metallic substrate overlap.

7. A wiring member according to claim 6, further comprising a hinge section which is located between the base section and the load beam section and which is bendable in a thickness direction of the load beam section.

8. The wiring member according to claim 1, further comprising a hinge section which is located between the base section and the load beam section and which is bendable in a thickness direction of the load beam section.

9. A wiring member for a suspension for a disc drive, wherein the suspension comprises a base section, a load beam section, and a flexure extending along the load beam section, said wiring member comprising:
   a metallic substrate;
   an electrical insulating layer which is formed on the metallic substrate, and which includes a thick-walled portion and a thin-walled portion which are different in thickness; and
   at least one conductor formed on the insulating layer such that a part of the at least one conductor extends over each of the thick-walled portion and the thin-walled portion of the insulating layer;
   wherein a part of each said conductor is provided in an aerial wiring portion in a longitudinal direction thereof, and the insulating layer in the aerial wiring portion does not overlap the metallic substrate; and
   wherein the thick-walled portion of the insulating layer is provided at least in the aerial wiring portion, and the thin-walled portion is provided in a region where the insulating layer and the metallic substrate overlap.

10. The wiring member according to claim 9, wherein a width of the part of each said conductor over the thin-walled portion is smaller than the part of the corresponding conductor over the thick-walled portion.

11. The wiring member according to claim 10, further comprising a hinge section which is located between the base section and the load beam section and which is bendable in a thickness direction of the load beam section.

12. The wiring member according to claim 9, further comprising a hinge section which is located between the base section and the load beam section and which is bendable in a thickness direction of the load beam section.

* * * * *